(12) United States Patent
Prunera-Usach et al.

(10) Patent No.: US 10,323,576 B2
(45) Date of Patent: Jun. 18, 2019

(54) COMPACT STRUCTURE FOR ACCESSORY GEARBOX OF AN AIRCRAFT TURBINE ENGINE

(71) Applicant: HISPANO SUIZA, Colombes (FR)

(72) Inventors: Stephane Prunera-Usach, Rueil Malmaison (FR); Guillaume Beck, Chantilly (FR); Jordane Peltier, Paris (FR)

(73) Assignee: SAFRAN TRANSMISSION SYSTEMS, Colombes (FR)

( * ) Notice: Subject to any disclaimer, the term of this patent is extended or adjusted under 35 U.S.C. 154(b) by 628 days.

(21) Appl. No.: 14/903,468

(22) PCT Filed: Jul. 9, 2014

(86) PCT No.: PCT/FR2014/051758
§ 371 (c)(1),
(2) Date: Jan. 7, 2016

(87) PCT Pub. No.: WO2015/004385
PCT Pub. Date: Jan. 15, 2015

(65) Prior Publication Data
US 2016/0146111 A1    May 26, 2016

(30) Foreign Application Priority Data
Jul. 10, 2013 (FR) ..................... 13 56788

(51) Int. Cl.
*F02C 7/32* (2006.01)
*B64C 27/12* (2006.01)
(Continued)

(52) U.S. Cl.
CPC ............. *F02C 7/32* (2013.01); *B64C 27/12* (2013.01); *F16H 1/28* (2013.01);
(Continued)

(58) Field of Classification Search
CPC .... F02C 7/32; F02C 7/36; F05D 2260/40311; F16H 1/28; F16H 2001/2881
See application file for complete search history.

(56) References Cited

U.S. PATENT DOCUMENTS 2,880,628 A * 4/1959 Jindrich Dobrohruska ................
F16H 37/00
123/179.28
2,951,631 A    9/1960 Gregory
(Continued)

FOREIGN PATENT DOCUMENTS

CH    406 769    1/1966
DE    197 29 620 A1    1/1998
(Continued)

OTHER PUBLICATIONS

International Search Report dated Sep. 10, 2014 in PCT/FR14/051758 Filed Jul. 9, 2014.

*Primary Examiner* — Erin D Bishop
(74) *Attorney, Agent, or Firm* — Oblon, McClelland, Maier & Neustadt, L.L.P.

(57) ABSTRACT

An aircraft drive chain including a plurality of main gears engaging with each other, a first main gear including a wall defining an inner space, an outer set of gear teeth being placed on an outer surface of the wall, the outer set of gear teeth engaging with at least one second main gear, a gear system being built into the inner space, the first main gear and the gear system being jointly configured so as to form a gearbox or reducer and ensure mechanical power transfer between a drive member and a slave member, the gear system being mounted onto the wall with a decoupling member.

10 Claims, 5 Drawing Sheets

(51) Int. Cl.
*F16H 1/28* (2006.01)
*F16C 19/54* (2006.01)
(52) U.S. Cl.
CPC .... *F05D 2260/40311* (2013.01); *F16C 19/54* (2013.01); *F16H 2001/2881* (2013.01); *Y02T 50/671* (2013.01)

(56) References Cited

U.S. PATENT DOCUMENTS

| | | | |
|---|---|---|---|
| 5,876,298 | A | 3/1999 | Kato et al. |
| 5,947,854 | A | 9/1999 | Kopko |
| 7,780,565 | B2 * | 8/2010 | Fusegi .................... F16H 48/08 475/160 |
| 8,221,277 | B2 * | 7/2012 | Vogel ...................... F16H 48/08 475/230 |
| 2012/0006137 | A1 | 1/2012 | Short et al. |

FOREIGN PATENT DOCUMENTS

| | | |
|---|---|---|
| EP | 2 405 116 A2 | 1/2012 |
| WO | 98/50715 A1 | 11/1998 |

* cited by examiner

COMPACT STRUCTURE FOR ACCESSORY GEARBOX OF AN AIRCRAFT TURBINE ENGINE

TECHNICAL FIELD AND PRIOR ART

This invention relates to gear chains (or drive chains) present in aircraft.

These gear chains are used to transfer mechanical power between drive members, for example a starter or a compressor of a turbine engine and slave members, for example accessories such as an electrical generator or hydraulic pump, or even the turbine engine compressor itself during its start-up phase, when it is driven in rotation by the starter. The accessory gearbox or AGB is one specific example of a gear chain for driving accessories. An accessory gearbox structure of this type is described in the American patent application US 2012/0006137.

A speed-increasing or reducer function is generally used to adapt the rotational speed of the input movement to the specific parameters of each drive member or slave member.

For example, a starter comprises two portions: a mobile member referred to as an impeller and a reducer.

However, in some specific cases, the drive member and the slave member must be decoupled. For example, the function itself of a starter is to assist in the start-up of the turbine engine. When the turbine engine reaches the desired rotational speed, the starter must be disconnected.

The invention aims at proposing a compact structure integrating a speed-increasing or reducer function and which can be disconnected in order to reduce the dimensions of the drive chain and/or accessories.

DESCRIPTION OF THE INVENTION

The invention therefore relates to an aircraft drive chain, for example an accessory drive chain of a turbine engine, including a plurality of main gears engaging with each other, a first main gear comprising a wall defining an inner space, an outer set of gear teeth being placed on an outer surface of the wall, the outer set of gear teeth engaging with at least one second main gear, a gear system separate from the plurality of main gears being built into the inner space, the first main gear and the gear system being jointly configured so as to form a speed-increaser or reducer and ensure mechanical power transfer between a drive member and a slave member, said gear system being mounted onto the wall by means of a decoupling member.

The invention further relates, for example, to an aircraft drive chain, for example an accessory drive chain of a turbine engine, the drive chain including a plurality of gears engaging with each other, the drive chain further including a second plurality of gears forming a gear system, as well as a decoupling member, the first plurality of gears and the second plurality of gears being connected by means of the decoupling member, a first gear of the first plurality of gears comprising a wall defining an inner space, an outer set of gear teeth being placed on an outer surface of the wall, the outer set of gear teeth engaging with at least one second gear of the first plurality of gears, the gear system being built into the inner space, the first gear and the gear system being jointly configured so as to form a speed-increaser or reducer and ensure mechanical power transfer between a drive member and a slave member, said gear system being mounted onto the wall by means of a decoupling member.

The invention thus allows for the integration and association of a speed-increasing (and/or reducer) structure and a decoupling member for a drive member or slave member of an aircraft in the inner space of a gear of an aircraft gear chain rather than in the inner space of the drive member or slave member itself. This reduces the volume occupied by this accessory and the weight located in the cantilever position. This advantageously results on the one hand in reduced stresses on the couplings supporting this member and on the other hand in an optimised inner volume of the module in which the gear chain is assembled. Furthermore, this integration takes place in the space defined by the gear without increasing the volume of the drive chain.

In the specific case of an AGB, the reduced accessories volume eases the integration of the latter in the turbine engine.

Moreover, the decoupling member enables a drive member or a slave member to only operate under certain rotation conditions at the movement input and movement output. For example, the starter of the aircraft turbine engine whose speed-increaser is integrated into a gear as described hereinabove, could advantageously only operate on turbine engine start-up.

According to one advantageous characteristic, said gear system comprises a member forming a crown, at least two planet gears, a member forming a planet carrier and a sun gear teeth set, the sun gear teeth set being placed on a first shaft connected to the drive member or the slave member, an inner set of gear teeth being placed on an inner surface of the member forming a crown, the planet gears engaging with the inner set of gear teeth and with the sun gear teeth set.

Advantageously, the member forming a crown comprises a rim on which an inner track of the decoupling member is made, the member forming the planet carrier being fixed with regard to an aircraft frame.

Alternatively, the member forming a crown comprises a ring-shaped wall that is fixed in relation to an aircraft frame, the member forming the planet carrier comprising a rim on which an inner track of the decoupling member is made.

According to one advantageous characteristic, a movement towards the first main gear is initiated by the outer set of gear teeth.

Alternatively, a movement towards the first main gear is initiated by the first shaft.

According to one advantageous characteristic, the decoupling member is configured to allow for a rotational decoupling of the gear system and the first main gear when the rotational speed of the first main gear is greater than the rotational speed of the member forming a crown or by disengagement caused by centrifugal force when the rotational speed of the gear reaches a set value.

According to one specific embodiment, the decoupling member comprises an overrunning clutch device.

In one specific embodiment, the planet gears of the gear system each have a first and a second set of gear teeth of different diameters.

Such a dual set of gear teeth advantageously offers a high transmission shift range in a minimum amount of space.

In one specific embodiment, said first main gear comprises a second shaft that is coaxial to the first shaft.

The invention therefore advantageously enables two accessories to be positioned opposite each other, rotating at very different speeds as a function of the dimensioning of the gear on the one hand and of the gearbox on the other hand.

In one specific configuration, the first main gear forms part of a ring and pinion.

It is, for example, possible that the first main gear of an AGB is the gear the closest to the compressor shaft.

The drive chain described hereinabove is, for example, intended for an AGB, PGB (Power GearBox), RGB (Reduction GearBox), RAT (Ram Air Turbine) or APU (Auxiliary Power Unit) drive device.

The invention can also relate to an accessory gearbox comprising a drive chain as described hereinabove.

The invention can further relate to a propeller gearbox comprising a drive chain as described hereinabove.

BRIEF DESCRIPTION OF THE FIGURES

This document will now describe, by way of non-limitative examples, embodiments of the invention with reference to the appended figures, wherein.

DETAILED DESCRIPTION OF THE SPECIFIC EMBODIMENTS

Figure 1A:
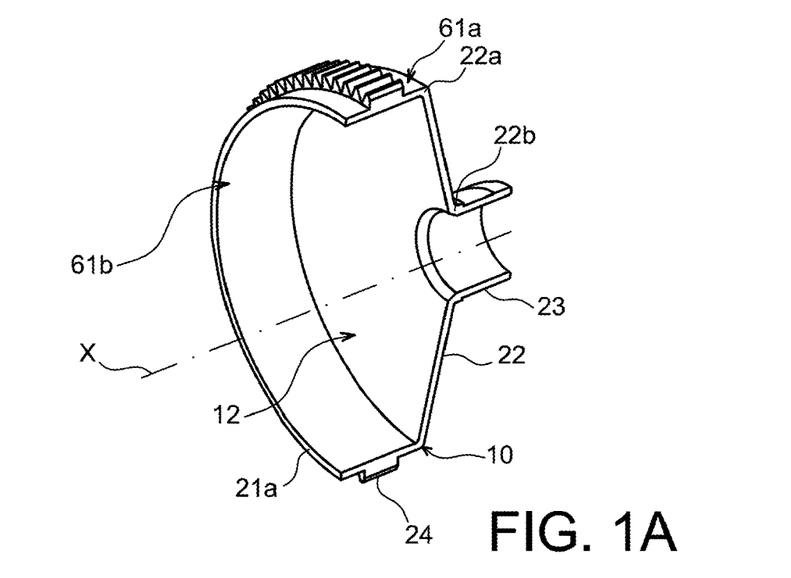
FIGS. 1A and 1B are perspective cross-sectional views showing on the one hand a gear having an inner housing, and on the other hand a device combining this gear, a decoupling member and a speed-increaser built into the inner housing (the speed-increaser and decoupling member being represented in this example by one unit)

FIG. 1A illustrates a gear 10 having a general funnel shape oriented in a longitudinal direction X.

The gear 10 comprises a ring-shaped rim 21a, a wheel disc 22, a strut 23 and an outer set of gear teeth 24.

The rim 21a and the strut 23 are cylindrical, coaxial and have a circular cross-section, the diameter of the strut 23 being less than the diameter of the rim 21a. The strut 23 is in this example a hollow shaft. Alternatively, the strut 23 is a solid shaft.

The wheel disc 22 in this example has a frustoconical shape. The wheel disc 22 is connected by a first circular edge 22a to an end edge of the rim 21a, and by a second circular edge 22b, having a diameter less than the first edge 22a, to an end edge of the strut 23. Alternatively and not shown in the figures, the wheel disc 22 is flat. The wheel disc 22 can also comprise openings onto a portion of its surface.

The rim 21a and the wheel disc 22 jointly define an inner housing 12.

The strut 23 extends from the wheel disc 22 opposite the inner housing 12.

The outer set of gear teeth 24 extends radially outwards from the rim 21a. The set of gear teeth 24 in this example comprises straight teeth. Alternatively and not shown in the figures, this set of gear teeth is helical or another type of gear teeth.

Figure 1B:
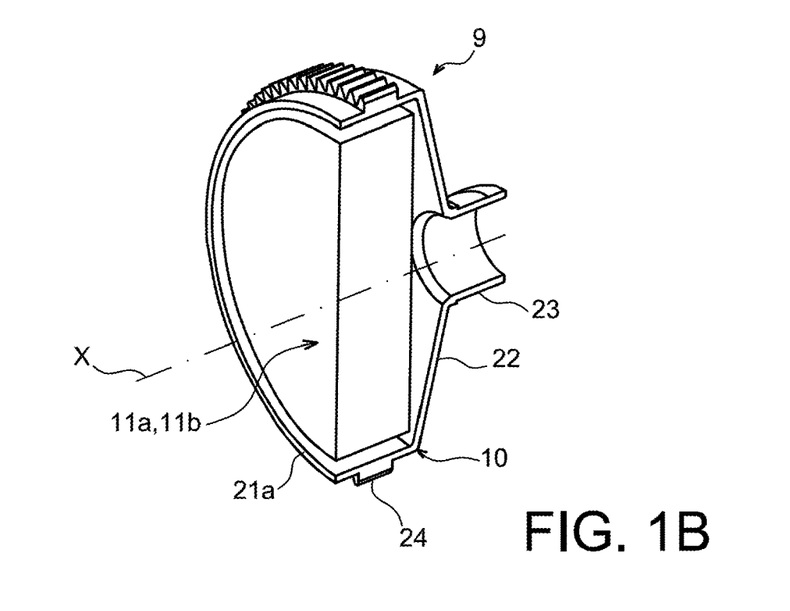

FIG. 1B illustrates a mechanical device 9 wherein a speed-increaser 11a and a decoupling member 11b are mounted in the inner housing 12 of the gear 10 described hereinabove. In FIG. 1B, the speed-increaser 11a and the decoupling member 11b are shown in a simplified form by a half-cylinder.

Figure 3:
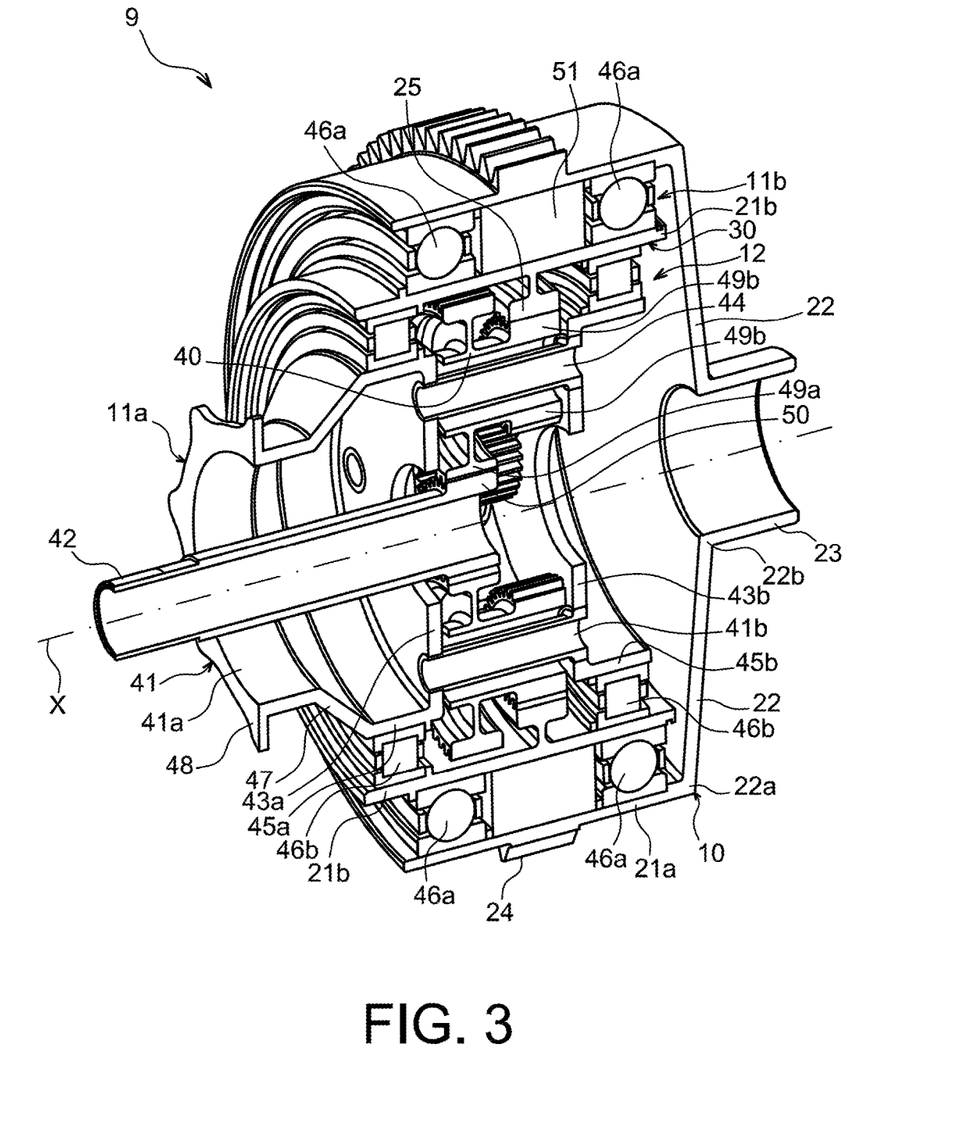
FIG. 3 is a perspective cross-sectional view of a first embodiment of the device in FIG. 1B and shows the speed-increaser built into the inner housing of the gear by means of the decoupling member.
Figure 4:
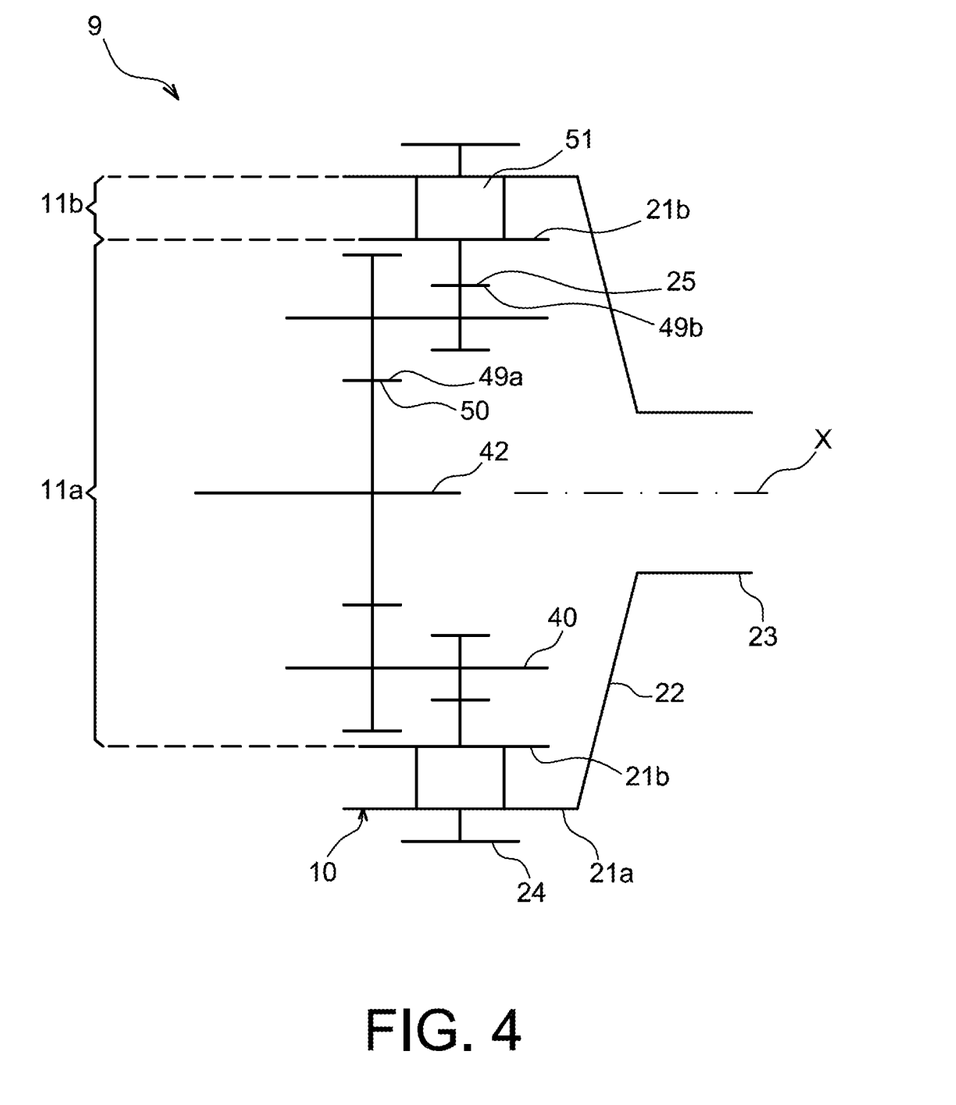
FIG. 4 is a kinematic diagram illustrating the interactions between the elements of the device in FIG. 3.

In the device 9 shown in FIGS. 3 and 4, the speed-increaser 11a comprises a crown 30, planet gears 40 for planets), a planet carrier 41 and a shaft 42.

The crown 30 comprises a ring-shaped rim 21b and an inner set of gear teeth 25. The rim 21b has a circular cross-section. The set of gear teeth 25 extends radially on the inner surface of the rim 21b. The set of gear teeth 25 in this example comprises straight teeth. Alternatively and not shown in the figures, this set of gear teeth is helical or another type of gear teeth.

The planets 40 are in this example gears with a double set of straight teeth 49a and 49b. More precisely, the planets 40 comprise two different outer sets of gear teeth, one set 49a having in this example a diameter greater than the other set 49b. In this example, there are four planets 40. Alternatively and not shown in the figures, the sets of gear teeth 49a and 49b are helical or another type of gear teeth, and/or the number of planet gears 40 is different to four, for example two or three.

In this example, the set of gear teeth 49b is engaged with the set of gear teeth 25 of the crown 30.

In the embodiment shown, the planet carrier 41 comprises two shells 41a and 41b and four shafts 44.

The first shell 41a, located the furthest from the wheel disc 22, comprises a wall 43a, a cylindrical portion 45a, a frustoconical portion 47 and a coupling 48. The wall 43a is a flat flange. The cylindrical portion 45a extends longitudinally from the wall 43a, opposite the strut 23. The frustoconical portion 47 extends by shrinking into the protrusion of the cylindrical portion 45a. Finally, the strut 48 of the planet carrier 41 is positioned at the distal end of the frustoconical portion 47, transversally to the longitudinal orientation X. The coupling 48 holds the planet carrier 41 in position in relation to a fixed frame, for example one of the gearboxes 4a or 4b.

The second shell 41b, located the closest to the wheel disc 22, comprises a wall 43b and a cylindrical portion 45b. The wall 43b is a flat flange. Alternatively, the walls 43a and/or 43b have shapes that differ from those shown. For example, either of these walls can include openings or be different from a flat element. The cylindrical portion 45b extends longitudinally from the wall 43b, towards the strut 23.

Two bearings 46b, in this example roller bearings, provide a mechanical, rotational link between the rim 21b of the crown 30 and the cylindrical portions 45a and 45b.

The walls 43a and 43b are parallel to each other. These walls 43a and 43b jointly support the shafts 44 on which the planet gears 40 are mounted and able to move in rotation.

The shaft 42 has a straight set of gear teeth 50 in an end housed in the planet carrier 41. In a version not shown in the figures, this set of gear teeth is helical or another type of gear teeth. This set of gear teeth 50 is engaged with the set of gear teeth 49a of each of the four planets 40. The shaft 42 in this example is coaxial with the strut 23 and the rim 21a.

The decoupling member 11b in this example comprises an overrunning clutch device 51 and two bearings 46a, in this example ball bearings.

The overrunning clutch device 51 and the two bearings 46a are inserted between the rim 21a of the gear 10 and the rim 21b of the crown 30, the overrunning clutch device 51 being positioned between the two bearings 46a.

The overrunning clutch device 51 is shown in FIGS. 3 and 4 in a simplified form by one ring-shaped unit. In a general manner, the overrunning clutch device 51 comprises two ring-shaped tracks. The outer track is formed in the rim 21a or in a separate ring mounted in the rim 21a. The inner track is formed in the rim 21b or in a separate ring mounted around the rim 21b.

In the specific and non-limitative example of an aircraft turbine engine starter, on start-up of the aircraft, the power firstly travels from a turbine of the starter to the motor of the aircraft via an AGB. The overrunning clutch device 51 is engaged as the torque is transmitted from the crown 30 to the main gear 10. Once the motor is started, the overrunning clutch device 51 enables the crown 30 and the gear 10 to be decoupled in rotation:

when the torque transmission direction is reversed until the torque is transmitted from the motor of the aircraft to the starter, or by disengagement caused by centrifugal force when the rotation speed of the gear 10 reaches a set value.

Figure 2A:
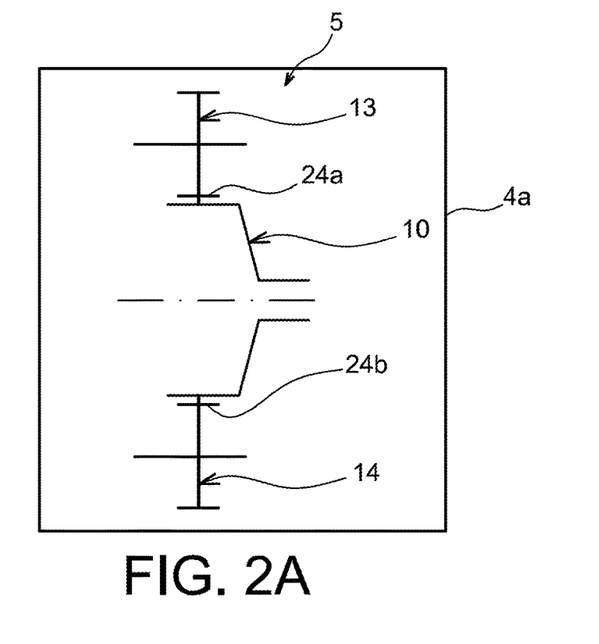
FIGS. 2A and 2B are kinematic diagrams illustrating two possibilities for integrating the gear in FIGS. 1A and 1B into different gear chains following the example of two AGBs, wherein the speed-increaser and the decoupling member are not shown.
Figure 2B:
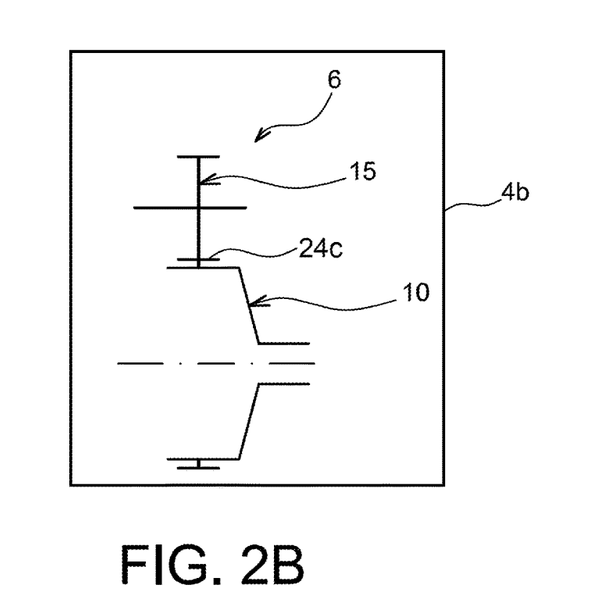

As can be seen in FIGS. 2A and 2B, the gear 10 can be integrated in different manners in a gear chain (or kinematic linkage).

In FIG. 2A, the gear 10 is mounted in a first kinematic linkage 5 of a gearbox 4a. More precisely, the gear 10 is engaged upstream in 24a with a cogwheel 13 and downstream 24b with a cogwheel 14. The term upstream is understood as meaning that the cogwheel 13 is, within the kinematic linkage 5, the closest to a compressor shaft from which a mechanical movement is taken. The start of rotation of the cogwheel 13 thus drives the gear 10 and the cogwheel 14 mounted downstream.

In FIG. 2B, the gear 10 is mounted in a second kinematic linkage 6 of a gearbox 4b. In this example, the gear 10 is engaged in 24c with a cogwheel 15 and is mounted at the end of the kinematic linkage 6.

Alternatively, the movement in the gearbox 4a from the compressor shaft is initiated by the gear 10, i.e. the gear 10 provides the power to the gear chains 5 or 6, respectively comprising the gears 13 and 14 (FIG. 2A) or 15 (FIG. 2B).

The examples in FIGS. 2A and 2B are not limitative and the gear 10 can be mounted in different locations in a kinematic linkage or even in a different kinematic linkage to that shown in FIGS. 2A and 2B.

Alternatively and not shown in the diagrams, the gear is part of a ring and pinion and the outer set of gear teeth is, for example, formed on a conical or frustoconical rim.

The gear 10 can be held in position in relation to a fixed frame of the aircraft by a coupling mounted on the strut 23 via a bearing, for example a roller bearing or a plain bearing (the fixed frame, the coupling and the bearing are not shown herein).

The device 9 shown in FIGS. 3 and 4 can be used as a gearbox or as a reducer, depending on whether the upstream part of the drive system is located on the side nearest the strut 23, the set of gear teeth 24 or the shaft 42.

The speed-increaser 11a is present in this example in the form of a compound planetary-gear system (i.e. comprising planets 40 with two sets of gear teeth 49a and 49b) wherein the crown 30 is the outer planet gear via the inner set of gear teeth 25 and wherein the set of gear teeth 50 positioned on the shaft 42 play the role of an inner mobile planet gear (or sun gear), the planet carrier 41 being secured to a fixed frame. The use of planets with two sets of gear teeth produces a greater transmission shift range than single gears. Nonetheless, the invention also covers the implementation of planet gears in the form of single gears, i.e. having the same set of gear teeth engaged both with the crown and the set of gear teeth 50 of the shaft 42.

Advantageously, the invention further enables two members to be positioned opposite each other, rotating at very different speeds, one being rotatably connected with the shaft 42, the other with the strut 23 or with a shaft connected to the strut 23.

Figure 5:
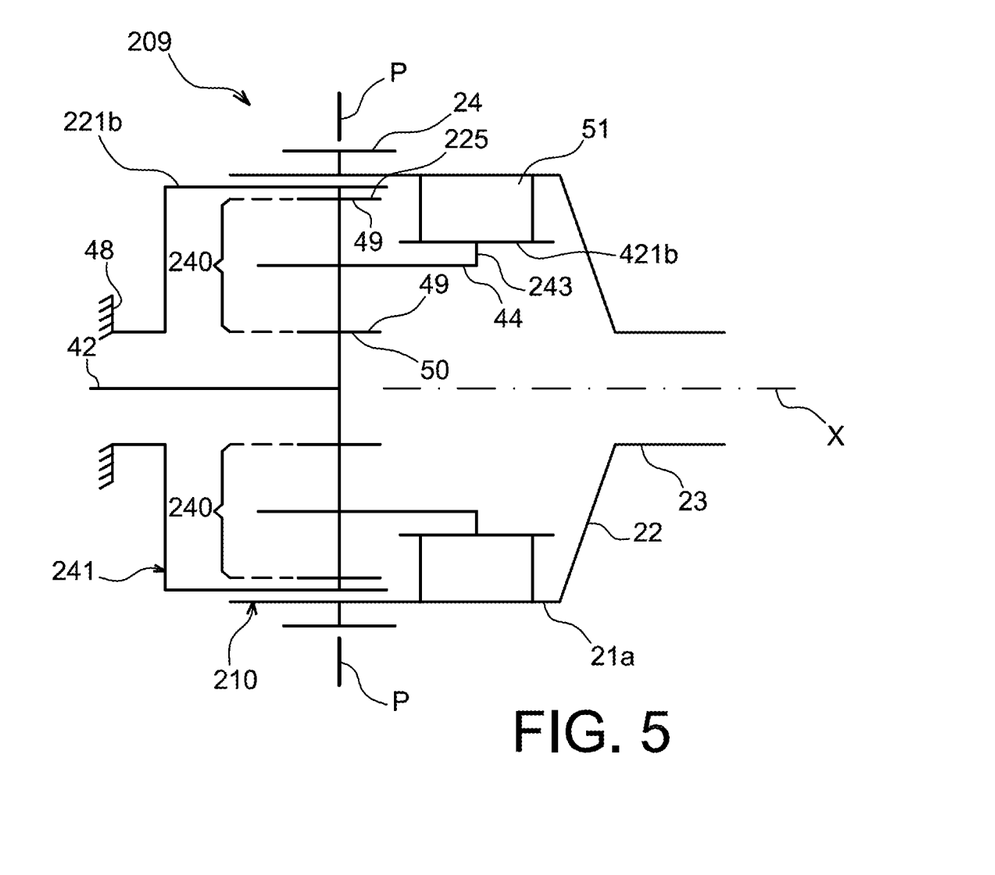
FIG. 5 is a kinematic diagram illustrating the interactions between the elements of a second embodiment of the device in FIG. 1B.

The device 209 illustrated in FIG. 5 is an alternative to the device 9 described with reference to FIGS. 3 and 4. The parts that are common to the devices 9 and 209 carry the same references and are not described again.

The device 209 comprises a gear 210, a crown 241 and a wall 243.

The wall 243 forms a planet carrier on which the shafts 44 and therefore the planet gears 40 are mounted. The wall 243 has a rim 421b on which is made an inner track of the overrunning clutch device 51.

The crown 241 has a ring-shaped portion 221b coaxial with the rim 21a of the gear 210. This ring-shaped portion 221b has an inner set of gear teeth 225 that engages with the set of gear teeth 49. The crown 241 is in this example secured to a frame of the gearbox that is fixed via a coupling 48.

The device 209 shown in FIG. 5 is present in the form of a single planetary gearset wherein the gear 210 plays the role of the mobile planet carrier by means of the overrunning clutch system 51.

With reference to FIGS. 2A and 2B, the gear chains 5 and 6 have been described as being mounted in an accessory gearbox 4a or 4b (or AGB). Alternatively, a propeller gearbox (PGB) comprises a gear chain such as 5 or 6. In this case, for example, the torque is initiated by the strut 23, the propeller is mounted on the shaft 42 and the accessories are powered via the set of gear teeth 24. Alternatively, an auxiliary power unit (APU) or a ram air turbine (RAT) comprise a gear chain 5 or 6 and provide a torque to the latter.

It should be noted that the invention is not limited to aircraft starters, and can apply to any mechanical device implementing a gear and a speed-increasing or reducer device, requiring decoupling between these two elements under certain rotation conditions.

The invention claimed is:

1. An aircraft drive chain including a plurality of main gears engaging with each other, a first main gear of the plurality of main gears comprising a wall defining an inner space, an outer set of gear teeth being placed on an outer surface of the wall, the outer set of gear teeth engaging with at least one second main gear of the plurality of main gears, a gear system being built into the inner space, the first main gear and the gear system being jointly configured so as to form a speed-increaser or reducer and ensure mechanical power transfer between a drive member and a slave member, said gear system being mounted onto the wall with a decoupling member, wherein the gear system comprises a member forming a crown, at least two planet gears, a member forming a planet carrier and a sun gear teeth set, the sun gear teeth set being placed on a first shaft connected to the drive member or the slave member, an inner set of gear teeth being placed on an inner surface of the member forming the crown, the planet gears engaging with the inner set of gear teeth and with the sun gear teeth set, and wherein the member forming the crown comprises a rim on which an inner track of the decoupling member is made, the member forming the planet carrier being fixed with regard to an aircraft frame.

2. The drive chain according to claim 1, wherein a movement towards the first main gear is initiated by the outer set of gear teeth.

3. The drive chain according to claim 1, wherein a movement towards the first main gear is initiated by the first shaft.

4. The drive chain according to claim 1, wherein the decoupling member is configured to allow for a rotational decoupling of the gear system and the first main gear when the rotational speed of the first main gear is greater than the rotational speed of the member forming the crown or by disengagement caused by centrifugal force when the rotational speed of the first main gear reaches a set value.

5. The drive chain according to claim 4, wherein the decoupling member comprises an overrunning clutch device.

6. The drive chain according to claim 1, wherein the planet gears of the gear system each have a first and a second set of gear teeth of different diameters.

7. The drive chain according to claim 1, wherein said first main gear comprises a second shaft that is coaxial to the first shaft.

8. The drive chain according to claim 1, wherein the drive chain is configured to be provided in an accessory gearbox, propeller gearbox, ram air turbine, or auxiliary power unit drive device.

9. An accessory gearbox comprising the drive chain according to claim 1.

10. A propeller gearbox comprising the drive chain according to claim 1.

* * * * *

UNITED STATES PATENT AND TRADEMARK OFFICE
CERTIFICATE OF CORRECTION

PATENT NO. : 10,323,576 B2
APPLICATION NO. : 14/903468
DATED : June 18, 2019
INVENTOR(S) : Stephane Prunera-Usach et al.

Page 1 of 1

It is certified that error appears in the above-identified patent and that said Letters Patent is hereby corrected as shown below:

On the Title Page

(71) Applicant, change "Hispano Suiza" to --Safran Transmission Systems--;

In the Specification

Column 4, Line 2, change "member lib are" to --member 11b are--; and

Column 4, Line 5, change "gears 40 for planets)" to --gears 40 (or planets)--.

Signed and Sealed this
Seventeenth Day of March, 2020

Andrei Iancu
*Director of the United States Patent and Trademark Office*